(12) United States Patent
Elias et al.

(10) Patent No.: US 10,273,910 B1
(45) Date of Patent: Apr. 30, 2019

(54) EXHAUST GAS DISTRIBUTION VALVE

(71) Applicant: DENSO International America, Inc., Southfield, MI (US)

(72) Inventors: Fadi Elias, Royal Oak, MI (US); Jonathan Logan, Walled Lake, MI (US); Mark Williams, Gaines, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/873,288

(22) Filed: Jan. 17, 2018

(51) Int. Cl.
| F02D 41/22 | (2006.01) |
| F02M 26/49 | (2016.01) |
| F16K 11/052 | (2006.01) |
| F02M 26/15 | (2016.01) |
| F02M 26/67 | (2016.01) |
| F02M 26/71 | (2016.01) |
| F02M 26/54 | (2016.01) |
| F02M 26/00 | (2016.01) |

(52) U.S. Cl.
CPC ........... *F02M 26/49* (2016.02); *F02D 41/221* (2013.01); *F02M 26/15* (2016.02); *F02M 26/54* (2016.02); *F02M 26/67* (2016.02); *F02M 26/71* (2016.02); *F16K 11/0525* (2013.01); *F02M 2026/001* (2016.02)

(58) Field of Classification Search
CPC ........ F02M 26/49; F02M 26/54; F02M 26/71; F02M 26/15; F02M 26/67; F02M 26/16; F02M 26/21; F02M 26/44; F02M 2026/001; F02D 41/221; F16K 11/0525

USPC .................. 123/568.16, 568.17, 568.18; 701/107–108; 73/114.74

See application file for complete search history.

(56) References Cited

U.S. PATENT DOCUMENTS

| 4,020,809 | A * | 5/1977 | Kern | .......................... | F02D 9/04 123/568.24 |
| 7,243,495 | B2 * | 7/2007 | Whelan | ............... | F02B 29/0406 123/568.12 |
| 7,617,678 | B2 * | 11/2009 | Joergl | .................... | F02M 26/16 123/568.12 |
| 7,743,816 | B2 * | 6/2010 | Mercz | ..................... | F16K 1/222 165/11.1 |
| 7,845,338 | B2 * | 12/2010 | Smith | ................... | F28D 7/1669 123/568.12 |
| 7,958,874 | B2 * | 6/2011 | Kobayashi | ............. | F02M 26/26 123/568.12 |
| 8,127,796 | B2 * | 3/2012 | Bonanno | ............. | F16K 11/0853 137/625.47 |
| 8,176,737 | B2 * | 5/2012 | Pierpont | ............... | F01N 13/107 137/625.47 |
| 8,196,403 | B2 * | 6/2012 | Hittle | ..................... | F02M 26/47 60/602 |
| 8,713,936 | B2 * | 5/2014 | Joergl | .................... | F02M 26/16 123/568.12 |

(Continued)

*Primary Examiner* — Hai H Huynh
(74) *Attorney, Agent, or Firm* — Harness, Dickey & Pierce, P.L.C.

(57) ABSTRACT

A valve assembly for an exhaust gas recirculation system of an engine. The valve assembly includes a three-way flow path housing defining an inlet, a first outlet, and a second outlet. A valve actuator is spaced apart from the three-way flow path housing and connected to the three-way flow path housing by a linkage. Actuation of the linkage by the valve actuator simultaneously opens the first outlet and closes the second outlet, and simultaneously closes the first outlet and opens the second outlet.

18 Claims, 4 Drawing Sheets

(56) References Cited

U.S. PATENT DOCUMENTS

| | | | |
|---|---|---|---|
| 9,458,945 B2 | 10/2016 | Gruneis | |
| 9,567,927 B2* | 2/2017 | Maurice | F02M 26/26 |
| 9,657,689 B2* | 5/2017 | Baasch | F02M 26/26 |
| 2014/0260242 A1 | 9/2014 | Chadwell et al. | |
| 2018/0258887 A1* | 9/2018 | Davison | F02M 26/25 |

* cited by examiner

EXHAUST GAS DISTRIBUTION VALVE

FIELD

The present disclosure relates to a valve for an exhaust gas recirculation system of an engine.

BACKGROUND

This section provides background information related to the present disclosure, which is not necessarily prior art.

In an exhaust gas distribution system, exhaust gas from one cylinder provides exhaust gas recirculation to an entire engine. A three-way valve downstream of the dedicated cylinder is used to direct exhaust flow either to an emissions control catalyst, or back to an intake of the system (known as an exhaust gas distribution loop). This valve is subject to high-temperature gasses flowing directly from the exhaust port(s) of the dedicated cylinder. In addition, when the dedicated cylinder is run rich, the exhaust products from the rich combustion cycle may harm or cause premature wear to the catalyst. Because of this, a zero or low leakage valve is desired to direct all dedicated cylinder exhaust back to the intake and prevent flow to the catalyst. A low leakage valve also helps maintain the desired EGR rate. While current valves are suitable for their intended use, they are subject to improvement. For example, current valves typically have low temperature limitations, and have difficulties meeting the low leakage requirements, especially over time. A three-way exhaust gas distribution valve that can perform well in a high-temperature environment and exhibits little or no exhaust leakage would therefore be desirable. The present disclosure advantageously provides for such an exhaust gas distribution valve, as explained in detail herein and as one skilled in the art will appreciate.

SUMMARY

This section provides a general summary of the disclosure, and is not a comprehensive disclosure of its full scope or all of its features.

The present disclosure includes a valve assembly for an exhaust gas recirculation system of an engine. The valve assembly includes a three-way flow path housing defining an inlet, a first outlet, and a second outlet. A valve actuator is spaced apart from the three-way flow path housing and connected to the three-way flow path housing by a linkage. Actuation of the linkage by the valve actuator simultaneously opens the first outlet and closes the second outlet, and simultaneously closes the first outlet and opens the second outlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
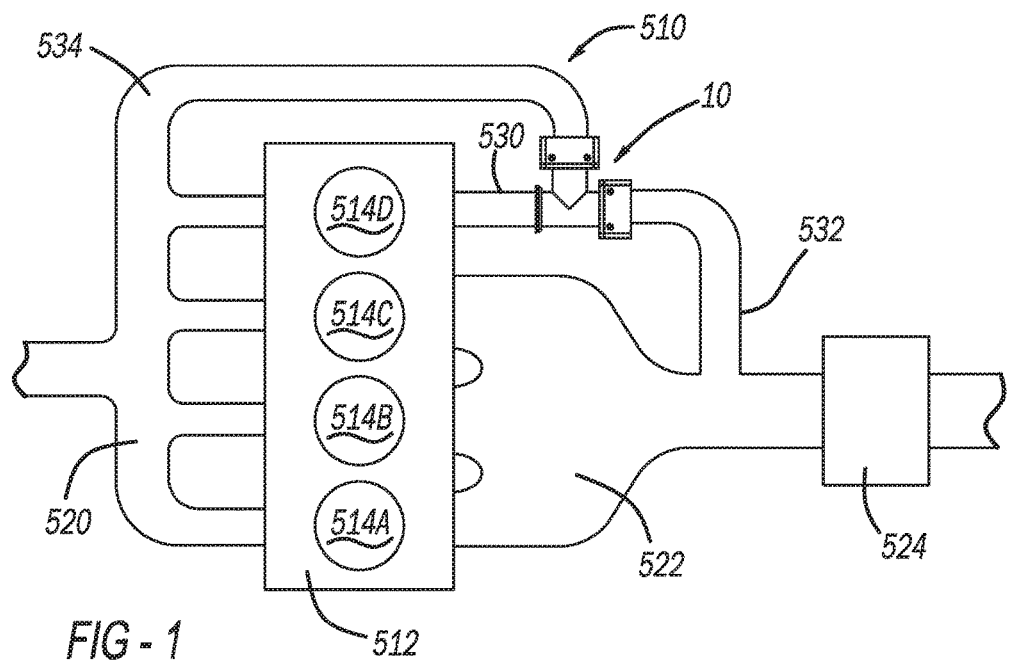
FIG. 1 illustrates an exemplary exhaust gas recirculation (EGR) system including an exemplary EGR valve assembly in accordance with the present disclosure.

FIG. 1 illustrates a valve assembly 10 in accordance with the present disclosure for an exhaust gas recirculation (EGR) system of an engine, such as the exemplary EGR system 510 for engine 512. The engine 512 can be any engine suitable for use with an EGR system. For example, the engine 512 can be configured for use with any suitable automobile, mass transit vehicle, recreational vehicle, military vehicle, construction equipment, watercraft, etc. The engine 512 can also be any engine suitable for nonvehicular uses, such as any suitable generator engine. The engine 512 includes a plurality of cylinders 514A, 514B, 514C, and 514D. The cylinder 514D is an EGR cylinder.

Figure 2:
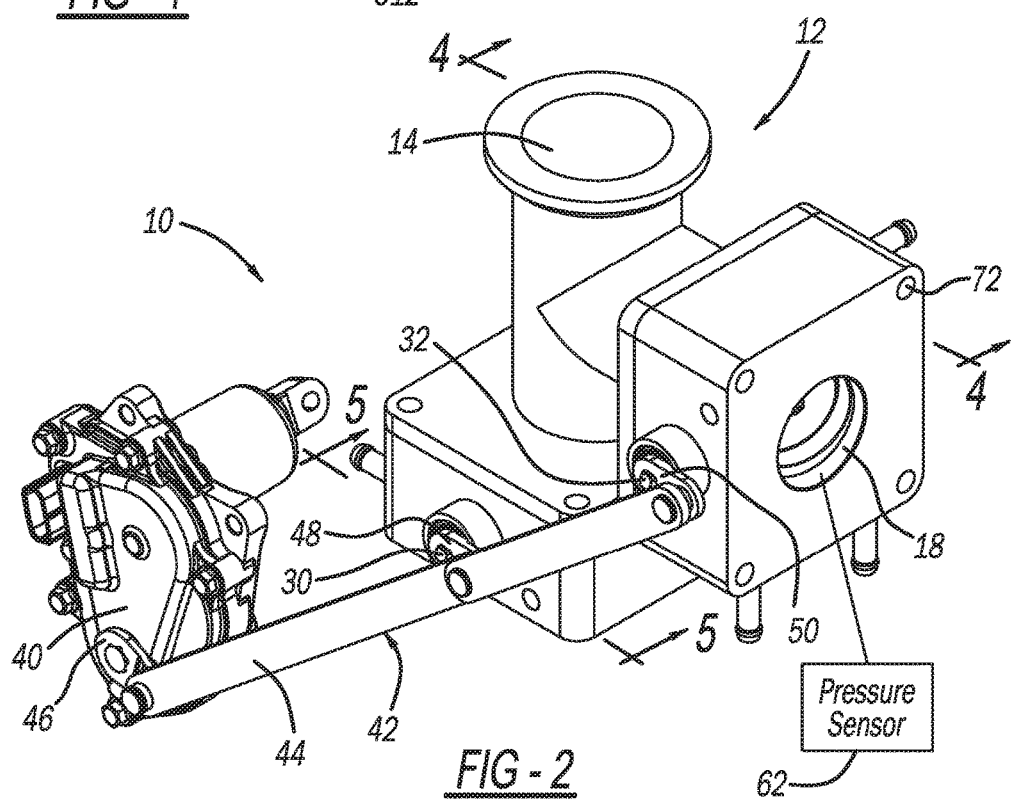
FIG. 2 is a perspective view of an exemplary EGR valve assembly in accordance with the present disclosure.
Figure 3:
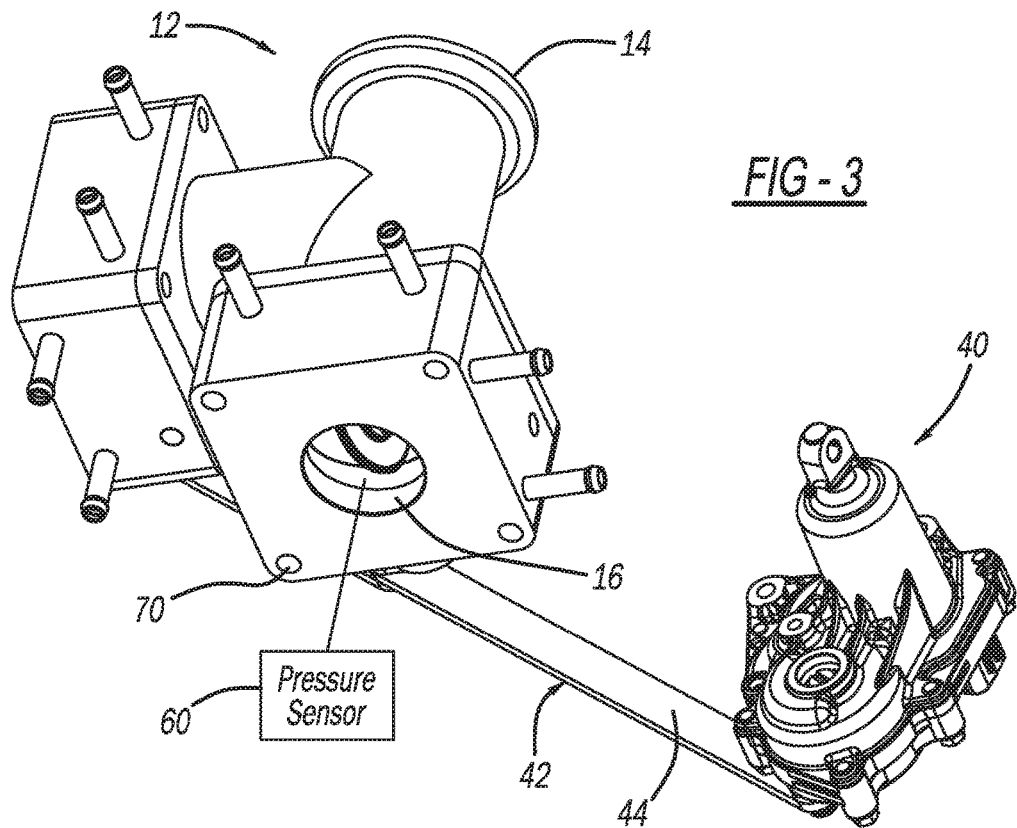
FIG. 3 is another perspective view of the EGR valve assembly of FIG. 2.
Figure 4:
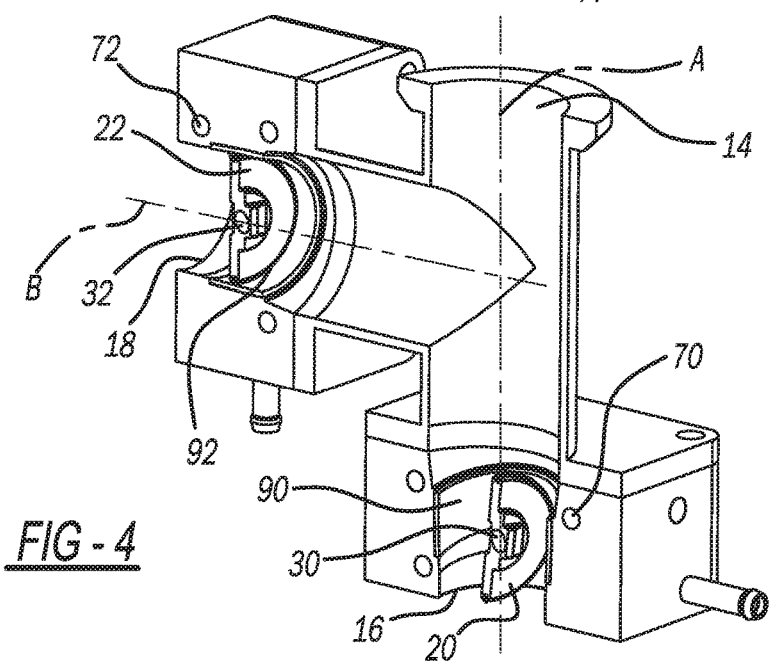
FIG. 4 is a cross-sectional view taken along line 4-4 of FIG. 2.

Air is directed to the engine 512, and the cylinders 514A-514D thereof, by an intake manifold 520. An exhaust manifold 522 directs exhaust from the cylinders 514A-514C to any suitable emissions reduction catalyst 524. With respect to the EGR cylinder 514D, an EGR cylinder exhaust outlet 530 directs exhaust from the EGR cylinder 514D to the valve assembly 10. As described further herein and as illustrated in FIGS. 2-4 for example, the valve assembly 10 includes an inlet 14, which is connected to the EGR cylinder exhaust outlet 530. A first outlet 16 of the valve assembly 10 is connected to an exhaust conduit 532, which directs exhaust to the emissions reduction catalyst 524. A second outlet 18 of the valve assembly 10 is connected to an EGR loop 534. The EGR loop 534 directs exhaust back to the intake manifold 520 and the cylinders 514A-514D. In some applications, the EGR system 510 can be configured such that the EGR loop 534 only directs exhaust to the EGR cylinder 514D. As explained herein, the valve assembly 10 can be configured to direct exhaust from the EGR cylinder 514D to either the exhaust conduit 532 or the EGR loop 534.

With additional reference to FIGS. 2-4, the valve assembly 10 will now be described in additional detail. The valve assembly 10 includes a flow path housing 12. The housing 12 can be a one-piece, monolithic housing with two valves integral with the housing 12. Alternatively, the housing 12 can be modular with one or both of the valves integral with the housing 12. The housing 12 defines the inlet 14, the first outlet 16, and the second outlet 18. The first outlet 16 is aligned with the inlet 14 along flow path A. The second outlet 18 is aligned along flow path B, which is perpendicular to the flow path A (see FIG. 4). The first outlet 16 is connected to the exhaust conduit 532, and the second outlet 18 is connected to the EGR loop 534. In some applications, however, the exhaust conduit 532 may be connected to the second outlet 18, and the EGR loop 534 may be connected to the first outlet 16.

With particular reference to FIG. 4, at the first outlet 16 is a first valve blade 20 and at the second outlet 18 is a second valve blade 22. The first valve blade 20 is mounted to a first valve shaft 30, and the second valve blade 22 is mounted to a second valve shaft 32. The first and second valve blades 20 and 22 are rotated by the respective first and second valve shafts 30 and 32 to open and close the first and second outlets 16 and 18. In the example of FIG. 4, the first valve blade 20 is arranged in an open position, extending generally along the flow path A. The second valve blade 22 is illustrated in a closed position.

The first and second valve blades 20 and 22 are opened and closed by any suitable actuator 40, which can be an electric waste gate actuator (E-WGA). The actuator 40 is arranged spaced apart from the flow path housing 12 so that the actuator 40 is not adversely affected by hot exhaust gas flowing through the flow path housing 12. The actuator 40 is connected to the flow path housing 12 by a linkage assembly 42. The linkage assembly 42 can be any suitable linkage for simultaneously opening and closing the first and second valve blades 20 and 22.

In the example illustrated, the linkage assembly 42 includes a main linkage 44, which is connected to an actuator sub-linkage 46. The actuator sub-linkage 46 is connected directly to the actuator 40. The main linkage 44 is also connected to a first valve sub-linkage 48 and a second valve sub-linkage 50. The first valve sub-linkage 48 is connected to the first valve shaft 30, and the second valve sub-linkage 50 is connected to the second valve shaft 32. Thus actuation of the actuator sub-linkage 46 by the actuator 40 in a first direction moves each one of the main linkage 44, the first valve sub-linkage 48, and the second valve sub-linkage 50 in a first direction. The first and second valve shafts 30 and 32 are thus rotated in a first direction to, for example, rotate the first valve blade 20 to the open position, and rotate the second valve blade 22 to the closed position illustrated in FIG. 4. Actuation of the actuator sub-linkage 46 by the actuator 40 in a second direction opposite to the first direction moves each one of the main linkage 44, the first valve sub-linkage 48, and the second valve sub-linkage 50 in a second direction, which is opposite to the first direction. This actuation rotates the first and second valve shafts 30 and 32 to move the first valve blade 20 to a closed position closing the first outlet 16, and moves the second valve blade 22 to an open position in order to open the second outlet 18, for example.

The valve assembly 10 further includes a first pressure sensor 60 and a second pressure sensor 62. The first pressure sensor 60 is at the first outlet 16 on a downstream side of the first valve blade 20. The second pressure sensor 62 is at the second outlet 18 on a downstream side of the second valve blade 22. The first and second pressure sensors 60 and 62 are configured to measure pressure at the first outlet 16 and the second outlet 18 respectively. Because the measured pressure will correspond to the positions of the first and second valve blades 20 and 22, whether the first and second valve blades 20 and 22 are open or closed can be identified based on the pressure measured by the first and second pressure sensors 60 and 62. Thus the first and second pressure sensors 60 and 62 advantageously make it possible to determine the positions of the first and second valve blades 20 and 22 in the event that the linkage assembly 42 fails, which would make reliance on a position sensor of the actuator 40 unreliable. Readings of each of the first pressure sensor 60 and the second pressure sensor 62 are compared to readings of a position sensor sensing position of the valve actuator 40 to monitor for: system faults including breakage of the linkage 44; and sensor failure including when readings of one of the first pressure sensor 60, the second pressure sensor 62, and the position sensor of the actuator 40 do not correspond with readings of another one of the first pressure sensor 60, the second pressure sensor 62, and the position sensor of the actuator 40.

The flow path housing 12 defines one or more coolant passages, such as first coolant passages 70 proximate to the first outlet 16, and second coolant passages 72 proximate to the second outlet 18. The first and second coolant passages 70 and 72 advantageously permit circulation of coolant through the flow path housing 12 in order to cool the flow path housing 12 and reduce the temperature of sensitive components thereof, such as the first and second valve shafts 30 and 32, and the first and second valve sub-linkages 48 and 50.

Figures 5, 6:
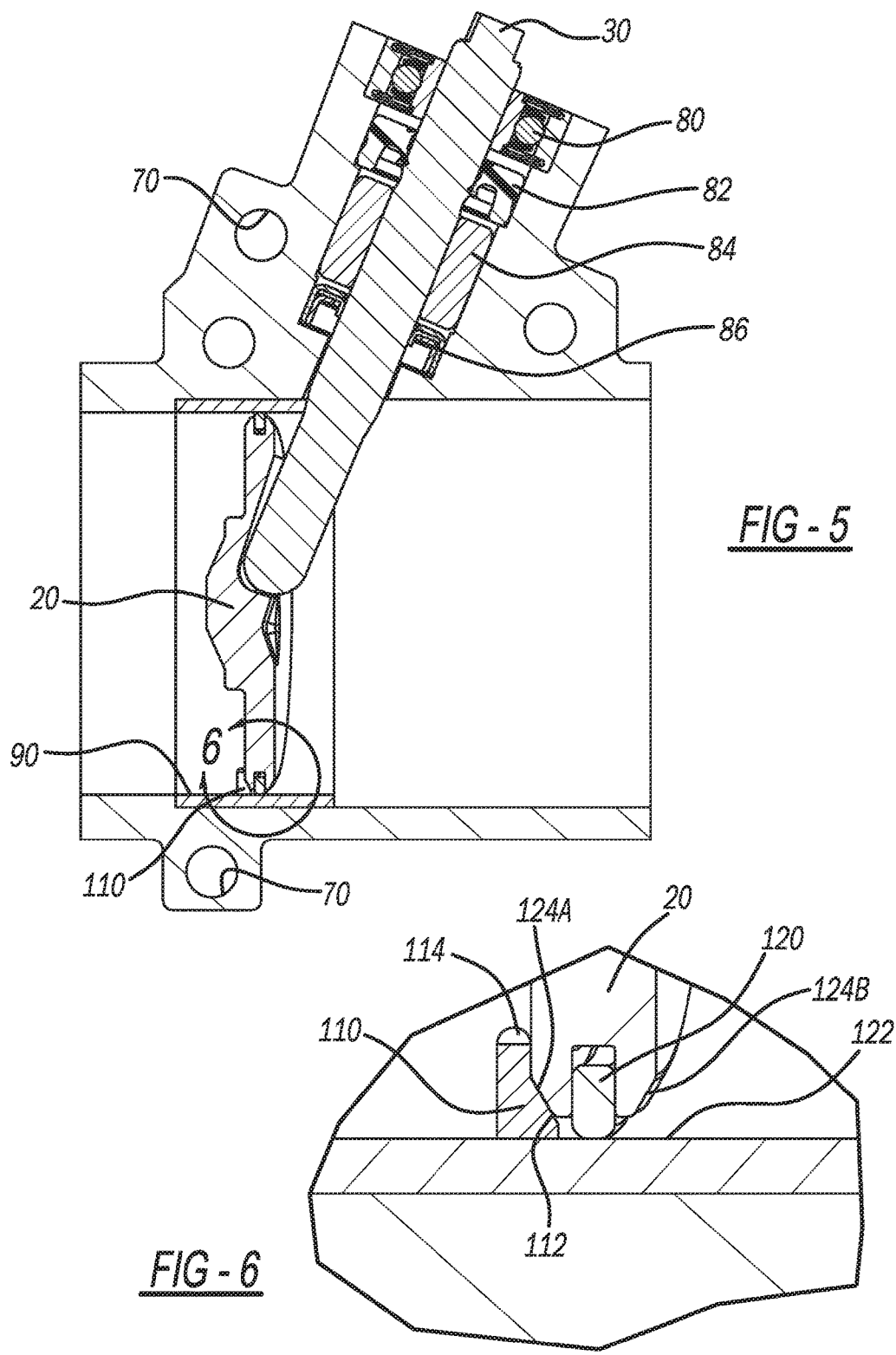
FIG. 5 is a cross-sectional view taken along line 5-5 of FIG. 2.
FIG. 6 illustrates area 6 of FIG. 5.

With reference to FIG. 5, the first coolant passages 70 are illustrated, as is the first valve shaft 30. The first valve shaft 30 extends to the first valve blade 20 through various shaft components, which may vary depending on the application. Exemplary shaft components may include one or more of the following: a first bearing 80; a first oil seal 82; a first bushing 84; and a first gas seal 86. The first bearing 80 facilitates rotation of the first valve shaft 30, as does the first bushing 84. The first oil seal 82 and the first gas seal 86 advantageously prevent the flow of oil and gas thereacross. The first coolant passages 70 are arranged proximate to the first bearing 80, the first oil seal 82, the first bushing 84, and the first gas seal 86 to prevent these components from being exposed to excessive heat. Although not specifically illustrated, the second valve shaft 32 likewise extends through any suitable shaft components, which may vary depending on the application, such as one or more of the following exemplary shaft components: a second bearing; a second oil seal; a second bushing; and a second gas seal. The second coolant passages 72 are arranged proximate to these components in order to prevent them from being subject to excessive temperatures. The illustrated configurations of the first and second valve shafts 30 and 32 are provided for exemplary purposes only. The present disclosure encompasses the use of any other suitable valve shaft configurations and components as well.

At the first outlet 16 is a first nozzle 90, and at the second outlet 18 is a second nozzle 92. The first and second nozzles 90 and 92 can be secured in any suitable manner, such as by being press fit into the first and second outlets 16 and 18 respectively from downstream ends thereof. With reference to FIGS. 5 and 6, the first nozzle 90 and the first valve blade 20 will be described in additional detail. The second nozzle 92 and the second valve blade 22 are substantially similar to the first nozzle 90 and the first valve blade 20, and thus the following description of the first nozzle 90 and the first valve blade 20 also applies to the second nozzle 92 and the second valve blade 22.

The first nozzle 90 includes a first valve seat 110, which can be integral with the first nozzle 90. The first valve seat 110 extends around an inner circumference of a wall 122 of the first nozzle 90. The first valve seat 110 has an angled face 112, and a seal 114. The angled face 112 is angled to correspond with an angled face 124A of the first valve blade 20. The angled face 124A is spaced apart from an angled face 124B at an opposite side of the first valve blade 20. Between the angled faces 124A and 124B is a first seal ring 120, which extends about an outer circumference of the first valve blade 20. Interaction between the first seal ring 120 and the wall 122, as well as interaction between the angled face 124A and the first valve seat 110 and seal 114 advantageously provides an improved seal between the first valve blade 20 and the first nozzle 90 to restrict the flow of exhaust when the first valve blade 20 is in the closed position.

Figure 7:
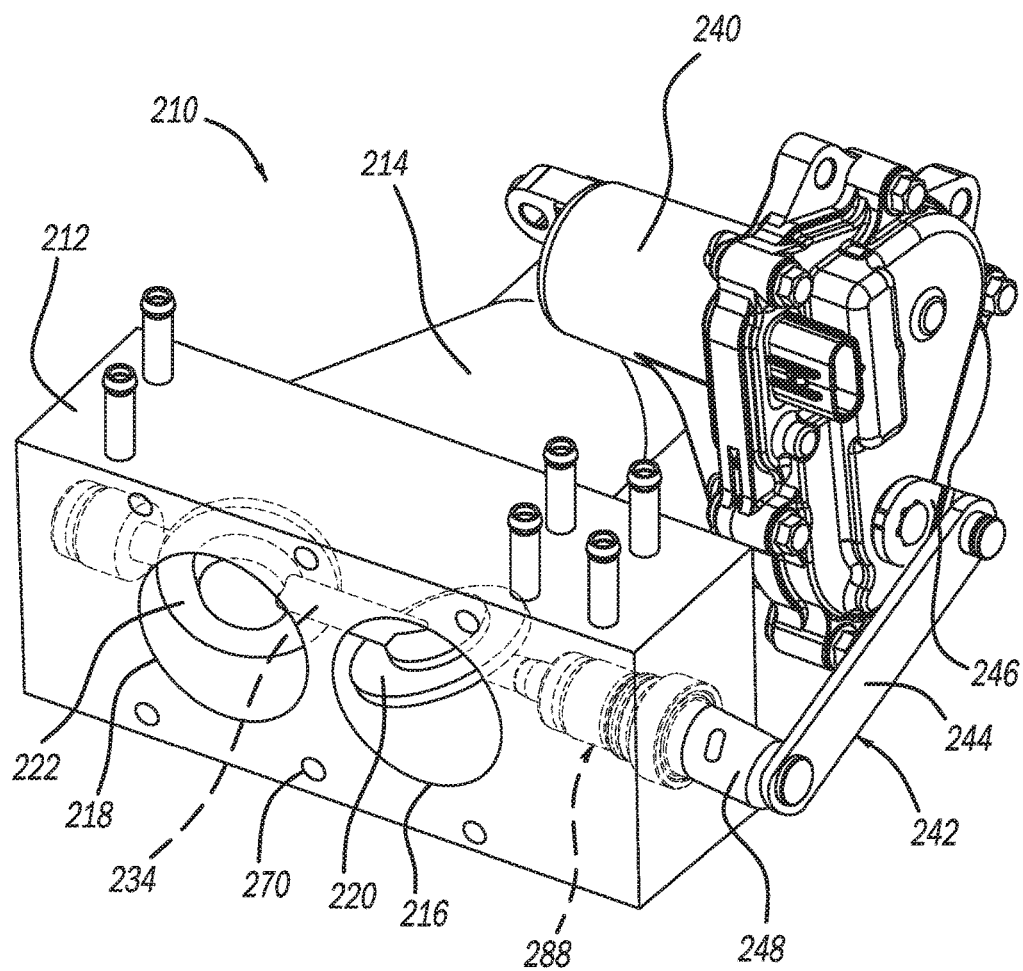
FIG. 7 is a perspective view of another EGR valve assembly in accordance with the present disclosure.

FIG. 7 illustrates an additional valve assembly according to the present disclosure at reference numeral 210. The valve assembly 210 includes numerous features in common with the valve assembly 10. Such features are designated in FIG. 7 with like reference numbers, but with the prefix "2." The description of the common features set forth above also generally applies to the valve assembly 210.

Unlike the valve assembly 10, the valve assembly 210 is a common shaft configuration, in which both the first valve blade 220 and the second valve blade 222 are mounted to a common valve shaft 234. The valve shaft 234 is actuated by a linkage assembly 242. The linkage assembly 242 includes a main linkage 244, which is connected to an actuator sub-linkage 246 and a valve sub-linkage 248. The valve sub-linkage 248 is connected to the common valve shaft 234. Actuation of the linkage assembly 242 by the actuator 240 rotates the valve shaft 234 in order to open and close the first and second valve blades 220 and 222. The common valve shaft 234 extends through components 288, which include a bearing, oil seal, bushing, and gas seal, which are similar to or the same as the first bearing 80, the first oil seal 82, the first bushing 84, and the first gas seal 86 described above. The valve assembly 210 thus advantageously has a simplified linkage assembly 242 and only a single valve shaft 234, which simplifies assembly and may reduce the overall cost thereof.

The present disclosure thus provides numerous advantages over the art. For example, positioning the actuators 40 and 240 spaced apart from the flow path housings 12 and 212 protects the actuators 40 and 240 from hot exhaust flow. Furthermore, the sealing arrangements at the first and second valve blades 20/220 and 22/222 is improved and prevents the flow of hot exhaust past the first and second valve blades 20 and 22 when the valve blades 20 and 22 are closed. This is particularly advantageous to prevent hot exhaust from damaging the catalyst 524 when the EGR cylinder 514D is run rich and the first valve blade 20 is closed. One skilled in the art will recognize that the present disclosure provides numerous additional advantages and unexpected results over the art.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A valve assembly for an exhaust gas recirculation system of an engine, the valve assembly comprising:
   a three-way flow path housing defining an inlet, a first outlet, and a second outlet;
   a valve actuator spaced apart from the three-way flow path housing and connected to the three-way flow path housing by a linkage, actuation of the linkage by the valve actuator simultaneously opens the first outlet and closes the second outlet, and simultaneously closes the first outlet and opens the second outlet; and a first pressure sensor at the first outlet and a second pressure sensor at the second outlet, the first and second pressure sensors configured to measure changes in pressure representative of the first outlet and the second outlet being open and closed;

wherein readings of each of the first pressure sensor and the second pressure sensor are compared to readings of a position sensor sensing position of the valve actuator to monitor for: system faults including breakage of the linkage; and sensor failure including when readings of one of the first pressure sensor, the second pressure sensor, and the position sensor do not correspond with readings of another one of the first pressure sensor, the second pressure sensor, and the position sensor.

2. The valve assembly of claim 1, wherein the first outlet is at an angle relative to the second outlet.

3. The valve assembly of claim 1, wherein:
the linkage is connected to a first valve blade rotatable to open and close the first outlet; and
the linkage is connected to a second valve blade rotatable to open and close the second outlet.

4. The valve assembly of claim 3, wherein:
the first valve blade is included with a first valve that is integral or modular with the three-way flow path housing; and
the second valve blade is included with a second valve that is integral or modular with the three-way flow path housing.

5. The valve assembly of claim 1, further comprising:
a first nozzle press-fit within the first outlet, the first nozzle including a first valve seat; and
a second nozzle press-fit within the second outlet, the second nozzle including a second valve seat.

6. The valve assembly of claim 1, wherein:
a first valve blade is rotatably mounted to a first valve shaft at the first outlet, and a second valve blade is rotatably mounted to a second valve shaft at the second outlet;
the first valve shaft extends through each one of a first bearing, a first oil seal, a first bushing, and a first gas seal; and
the second valve shaft extends through each one of a second bearing, a second oil seal, a second bushing, and a second gas seal.

7. A valve assembly for an exhaust gas recirculation system of an engine, the valve assembly comprising:
a flow path housing defining an inlet, a first outlet, and a second outlet;
a first valve blade at the first outlet;
a second valve blade at the second outlet;
a valve actuator spaced apart from the housing;
a linkage connecting the valve actuator to both the first valve blade and the second valve blade to open and close the first valve blade and the second valve blade in response to actuation by the actuator;
a first pressure sensor at the first outlet, and a second pressure sensor at the second outlet for identifying positions of the first valve blade and the second valve blade based on readings from at least one of the first pressure sensor and the second pressure sensor;
wherein readings of each of the first pressure sensor and the second pressure sensor are compared to readings of a position sensor sensing position of the valve actuator to monitor for: system faults including breakage of the linkage; and sensor failure including when readings of one of the first pressure sensor, the second pressure sensor, and the position sensor do not correspond with readings of another one of the first pressure sensor, the second pressure sensor, and the position sensor.

8. The valve assembly of claim 7, wherein the first outlet is at an angle relative to the second outlet.

9. The valve assembly of claim 7, wherein the first valve blade and the second valve blade are connected to the linkage such that the first valve blade is open when the second valve blade is closed, and the first valve blade is closed when the second valve blade is open.

10. The valve assembly of claim 7, wherein the valve actuator is an electric waste gate actuator.

11. The valve assembly of claim 7, further comprising a first valve seat at the first outlet and a second valve seat at the second outlet.

12. The valve assembly of claim 11, wherein:
the first valve blade has a first angled face configured to abut the first valve seat, which is angled; and
the second valve blade has a second angled face configured to abut the second valve seat, which is angled.

13. The valve assembly of claim 7, further comprising a first seal ring at an outer periphery of the first valve blade, and a second seal ring at an outer periphery of the second valve blade.

14. The valve assembly of claim 7, wherein:
the first valve blade is rotatably mounted to a first valve shaft, and the second valve blade is rotatably mounted to a second valve shaft;
the first valve shaft extends through each one of a first bearing, a first oil seal, a first bushing, and a first gas seal; and
the second valve shaft extends through each one of a second bearing, a second oil seal, a second bushing, and a second gas seal.

15. The valve assembly of claim 7, wherein the first valve blade and the second valve blade are each mounted to, and rotated by, a common valve shaft.

16. The valve assembly of claim 15, further comprising a bearing, an oil seal, a bushing, and a gas seal through which the common valve shaft extends.

17. The valve assembly of claim 7, further comprising a plurality of coolant passages defined by the flow path housing for circulating coolant through the flow path housing to cool the flow path housing.

18. An exhaust gas recirculation system comprising:
a three-way valve defining: an inlet configured to connect to an exhaust gas recirculation (EGR) cylinder exhaust outlet to receive exhaust from an EGR cylinder of an engine into the three-way valve; a first outlet configured to connect to an exhaust conduit directing exhaust out of the three-way valve to an emissions control catalyst; and a second outlet configured to connect to an EGR loop directing exhaust back to an intake manifold of the engine, the second outlet is oriented 90° relative to the first outlet;
a first valve blade at the first outlet;
a second valve blade at the second outlet;
a valve actuator spaced apart from the housing;
a linkage connecting the valve actuator to both the first valve blade and the second valve blade to open and close the first valve blade and the second valve blade in response to actuation by the actuator, the first valve blade and the second valve blade are connected to the linkage such that the first valve blade is open when the second valve blade is closed, and the first valve blade is closed when the second valve blade is open;
a first pressure sensor at the first outlet and a second pressure sensor at the second outlet for identifying positions of the first valve blade and the second valve blade based on readings from at least one of the first pressure sensor and the second pressure sensor;
wherein readings of each of the first pressure sensor and the second pressure sensor are compared to readings of a position sensor sensing position of the valve actuator to monitor for: system faults including breakage of the linkage; and sensor failure including when readings of one of the first pressure sensor, the second pressure sensor, and the position sensor do not correspond with readings of another one of the first pressure sensor, the second pressure sensor, and the position sensor.

* * * * *